US007904090B2

(12) United States Patent
Johansson et al.

(10) Patent No.: US 7,904,090 B2
(45) Date of Patent: Mar. 8, 2011

(54) TRAFFIC CONTROL METHOD

(75) Inventors: Per Johansson, San Diego, CA (US);
Rajesh Mishra, San Diego, CA (US)

(73) Assignee: **Telefonaktiebolaget L M Ericsson
(Publ)**, Stockholm (SE)

( * ) Notice: Subject to any disclaimer, the term of this patent is extended or adjusted under 35 U.S.C. 154(b) by 1294 days.

(21) Appl. No.: 10/595,973

(22) PCT Filed: Dec. 1, 2003

(86) PCT No.: PCT/SE03/01865
§ 371 (c)(1),
(2), (4) Date: May 23, 2006

(87) PCT Pub. No.: WO2005/055524
PCT Pub. Date: Jun. 16, 2005

(65) Prior Publication Data
US 2007/0060169 A1    Mar. 15, 2007

(51) Int. Cl.
*H04W 40/00*    (2009.01)
*H04W 72/00*    (2009.01)

(52) U.S. Cl. ........................................ 455/445; 455/453

(58) Field of Classification Search .................. 455/445, 455/453
See application file for complete search history.

(56) References Cited

U.S. PATENT DOCUMENTS

| 2002/0173315 | A1 |  | 11/2002 | Chmaytelli et al. |
|---|---|---|---|---|
| 2003/0065762 | A1 | * | 4/2003 | Stolorz et al. ................. 709/223 |
| 2003/0100308 | A1 | * | 5/2003 | Rusch ........................... 455/445 |
| 2004/0136324 | A1 | * | 7/2004 | Steinberg et al. ............. 370/238 |
| 2005/0120140 | A1 | * | 6/2005 | Bodlaender ................... 709/249 |

FOREIGN PATENT DOCUMENTS

| WO | WO 0067435 A1 | 11/2000 |
|---|---|---|
| WO | WO 0230133 A2 | 4/2002 |
| WO | WO 02080452 A2 | 10/2002 |
| WO | WO 03047177 A1 | 6/2003 |

* cited by examiner

Primary Examiner — Nghi H Ly
Assistant Examiner — Timothy Pham
(74) Attorney, Agent, or Firm — Roger S. Burleigh

(57) ABSTRACT

The invention relates to traffic handling in multi-access communication systems (100). A network-level solution is proposed, in which the access networks (20) provide a network-based ATC server (61) with access-related information comprising measured performance parameters. The ATC server may also receive information from the multi-access terminal (10), e.g. about available access networks. The ATC server coordinates the information and uses it for adaptive traffic control calculations. This typically involves continuously executing an adaptive traffic control algorithm for reaching predetermined control objectives. The control algorithm tracks the reference values and outputs a feedback control signal that is sent back to the user devices. Based on the feedback control signal the multi-access terminals spread their traffic over the available access networks.

33 Claims, 8 Drawing Sheets

TRAFFIC CONTROL METHOD

TECHNICAL FIELD

The present invention generally relates to multi-access communication systems and in particular to a method for user traffic control in such systems.

BACKGROUND

Network services based on the Internet Protocol (IP) are today offered over several types of wireline and wireless network technologies. Internet Service Providers (ISPs) and network operators who own and handle several different types of access networks are starting to offer service bundles, such as General Packet Radio Service (GPRS) and Wireless Local Area Network (WLAN) access within the same subscription. Mobile end user devices that offer multiple access interfaces are also reality and are expected to become the norm (e.g. Personal Digital Assistants (PDAs) and laptops with GPRS, WLAN, Ethernet and Bluetooth).

Multi-access communication systems are in general more flexible than single-access networks but they also introduce an additional degree of complexity and involve a number of new requirements, choices and considerations. Thus, mechanisms that are capable of handling user traffic and packet flows in complex multi-access network in a satisfactory manner would be very desirable.

General aspects of multi-access are dealt with in the framework of the Always Best Connected (ABC) service [1], which envisions a communication environment where the user is always connected over the best available access network and device. Some important areas in this context are subscription handling and infrastructures for authentication/authorization; mobility management; and how to choose access including how to define "best".

In a scenario where a user may have several options for IP network access, either through the same network service operator (ISP and/or mobile operator), or via multiple operators and subscriptions, a choice of access thus needs to be made. This choice can be based on different factors such as:
  Access cost for the user
  Performance requirements (due to type of application, device etc.)
  Available access networks for the user (coverage, device, subscription profile etc.)
  Network operator's preferences (load balancing, traffic priority etc.)

In this context it is a challenge to balance factors like the above into an appropriate decision on what access network to choose.

In accordance with the International Patent Application WO 01/35585 A1 [2], the end device identifies available access networks and uses an indirect interface, such as a Bluetooth radio interface, to determine their respective access capability (cost of access, available bandwidth, etc.). The determined access capability is compared to a preferred access capability of the end device/user, which is stored at the end device and can be updated by the user. After all available access networks have been checked, a best access is selected. The end device may continue to look for new available access networks and reconsider its access decision during a connection.

U.S. Patent Application 2001/0141393 A1 [3] addresses situations where access to an IP-based communication network can be obtained via a plurality of bearers. In order to let applications and users benefit from the availability of several transport alternatives, [3] permits multiple packet flows to and from an application to utilize multiple accesses simultaneously. Hereby, different packet flows (e.g. video and audio media flows) of the same session, can use different access technologies depending on their respective characteristics. The mapping of flows onto the bearers is controlled by a link manager arranged in the user equipment. The link manager defines routing tables for the packet communication based on e.g. user or external preferences that can be stored in a policy database in the user equipment.

Conventional traffic handling mechanisms like the above-described solutions of [2], [3] are generally associated with rather heavy demands on both the end user and on his/her user equipment. The solutions are primarily focused on the best access seen from a user perspective, which may not always coincide with what is best for the overall traffic situation. Furthermore, very frequent updates of the prioritization list would be required in order to respond properly to changed conditions.

Accordingly, there is a considerable need for an improved method of handling traffic in communication systems associated with several access possibilities.

SUMMARY

A general object of the present invention is to provide an improved method for traffic handling in multi-access networks. A specific object is to achieve an improved overall performance in communication systems that are associated with several access possibilities. Another object is to provide a traffic control mechanism that is suitable for being used in overall access solutions like the ABC service. Still other objects are to provide traffic control mechanisms for multi-access networks that are flexible and independent of access technology.

These objects are achieved in accordance with the attached claims.

Briefly, the invention improves the overall performance in multi-access communication systems by adaptively splitting the user traffic over several access networks. This can be achieved by algorithms for Adaptive Traffic Control (ATC) of user traffic based on measurements and estimates of network performance conditions in access networks and/or user devices. In the proposed solution a network-based ATC server device has a key role in the inter-network traffic management.

Access-related information is communicated from the access networks to the ATC server. Preferably, the ATC server also receives information from the multi-access terminal(s). The ATC server performs coordinating actions, such as aggregating and processing, on the received data/information. Through adaptive traffic control calculations, a traffic control signal is thereafter determined based on the coordinated information from the access networks (and multi-access terminal). This preferably involves iterative/continues executions of an adaptive traffic control algorithm for reaching a predetermined control objective, such as minimizing the difference between output signals from the controlled access system and predetermined reference values. In a preferred embodiment the adaptive traffic control algorithm is executed at the ATC server.

In response to the traffic control signal, user traffic is distributed over at least a subset of the access networks by an ATC client of the terminal. The ATC client generally decides how to spread the traffic over the different access networks based on information/recommendations from the ATC server. The traffic spreading is preferably session-based.

The method for adaptive traffic control according to the invention offers a number of advantages. The control mechanism is automatically changing in response to changed conditions in the controlled system, enabling a continuously optimized traffic distribution. Furthermore, the adaptive traffic control results in an improved overall performance in multi-access networks. Another advantage of the proposed traffic control method is that it is independent of access technology. It is also very flexible with regard to arrangement of control functionality.

An advantageous embodiment of the invention achieves mobility by means of IP tunneling, i.e. an IP-in-IP tunnel is hiding the fact that a terminal is not in the home network, together with new mobility mechanisms, such as mobility IP addresses and virtual access network interfaces. The proposed mobility solution is capable of handling mobility between multiple active interfaces.

According to other aspects of the invention a communication system, a server device and a multi-access terminal with means for traffic control in multi-access networks are provided.

BRIEF DESCRIPTION OF THE DRAWINGS

The invention, together with further objects and advantages thereof, is best understood by reference to the following description and the accompanying drawings, in which.

DETAILED DESCRIPTION

Throughout the drawings the same reference numbers are used for similar or corresponding elements.

Figure 1:
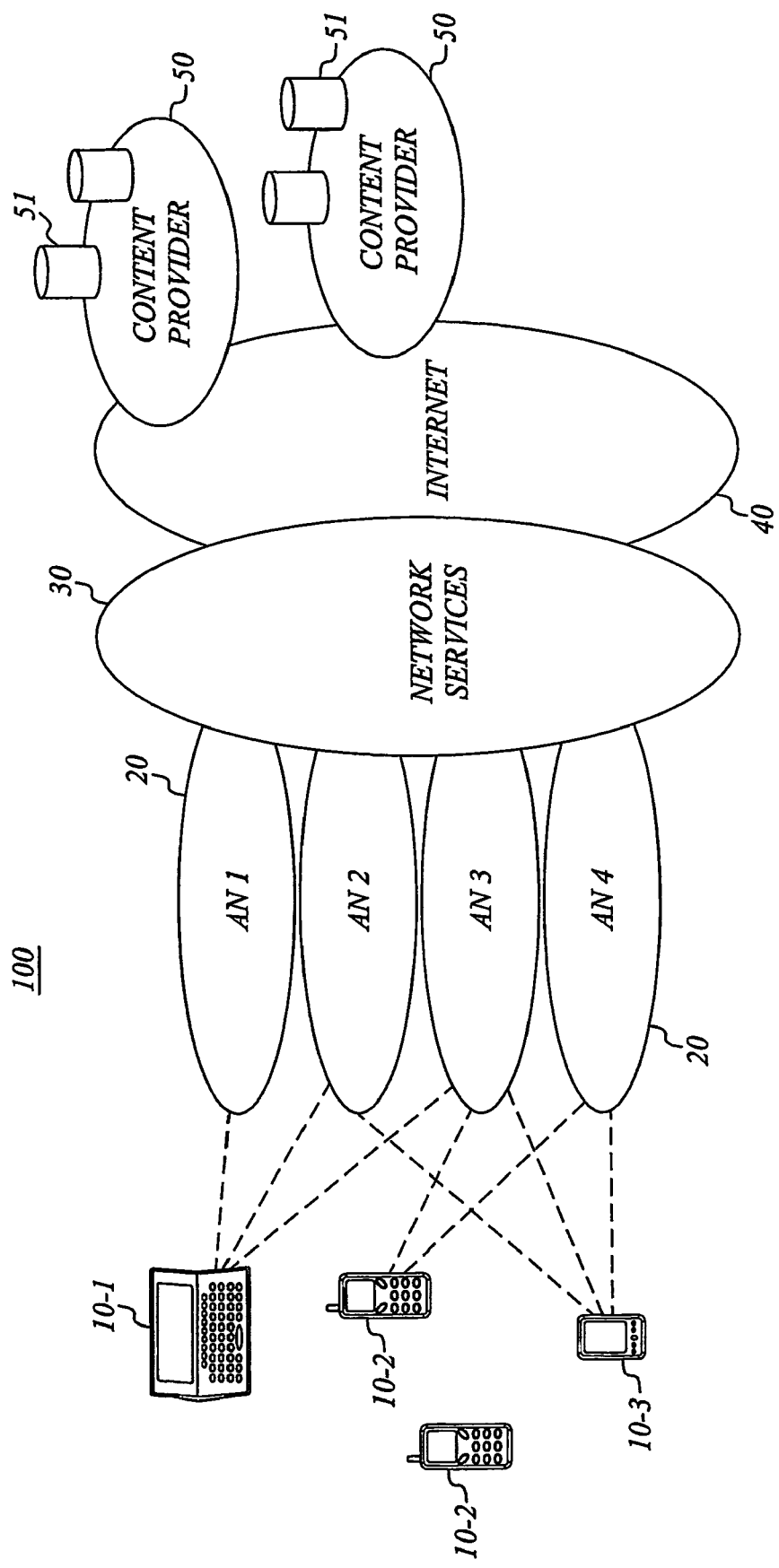
FIG. 1 is a schematic view of a multi-access communication system in which the present invention can be used.

As mentioned in the background section, today many communication systems comprise a plurality of access networks offering alternative access options for mobile terminals with multiple access interfaces. Such a multi-access communication system, in which the present invention can be used, is schematically illustrated in FIG. 1. The illustrated IP-based communication system 100 comprises mobile terminals 10 connected to network services 30 over access networks (ANs) 20.

The invention can be applied in connection with any mobile node/terminal that is associated with at least two access network interfaces (also referred to as a multi-access terminal). In the illustrated system 100, the multi-access terminals 10 are represented by a laptop computer 10-1, cellular phones 10-2 and a PDA 10-3. The access network interfaces of the multi-access terminal are typically direct external network accesses to the respective access networks. However, the network access could also be obtained via another device that belongs to the same personal area network (PAN) as the multi-access terminal, i.e. the access interfaces are distributed over the PAN devices.

The access networks 20 can be wireline or wireless and may for instance use a technology selected from the group of GPRS, WLAN, Ethernet, Bluetooth, Wireless Fidelity (WiFi), XDSL (DSL=Digital Subscriber Line), Code Division Multiple Access (CDMA), Wideband CDMA (WCDMA) and cable modem. For the purpose of this document, two networks can e.g. be considered as separate access networks if they use separate access network technologies, such as a GPRS and a WLAN system and/or have different owners or operators. The access network definitions can also be based on geography and/or IP addresses. The properties and characteristics of the access networks 20 may differ a lot in terms of features like capacity dynamics, cost and acceptable load levels.

The access networks 20 are thus used by the mobile terminals 10 to reach an IP-based network services 30. The network services 30 can be any kind of services that have been made available over an IP-based network, such as the Internet 40, by a content provider 50 with associated databases/data sources 51. Examples of network services include content distribution network services with content caching, Mobile IP services, authentication services, multimedia messaging services (MMS), voice over IP services, etc.

In order to improve the overall performance in multi-access communication systems like the one in FIG. 1, the present invention proposes to adaptively split the user traffic over several access networks. This can be achieved by using algorithms for Adaptive Traffic Control (ATC) of user traffic in a multi-access environment. The ATC algorithms are based on measurements and estimates of network performance conditions in access networks and/or user devices. This will be explained in the following but first the main structure of the ATC system will be described with reference to FIG. 2.

Figure 2:
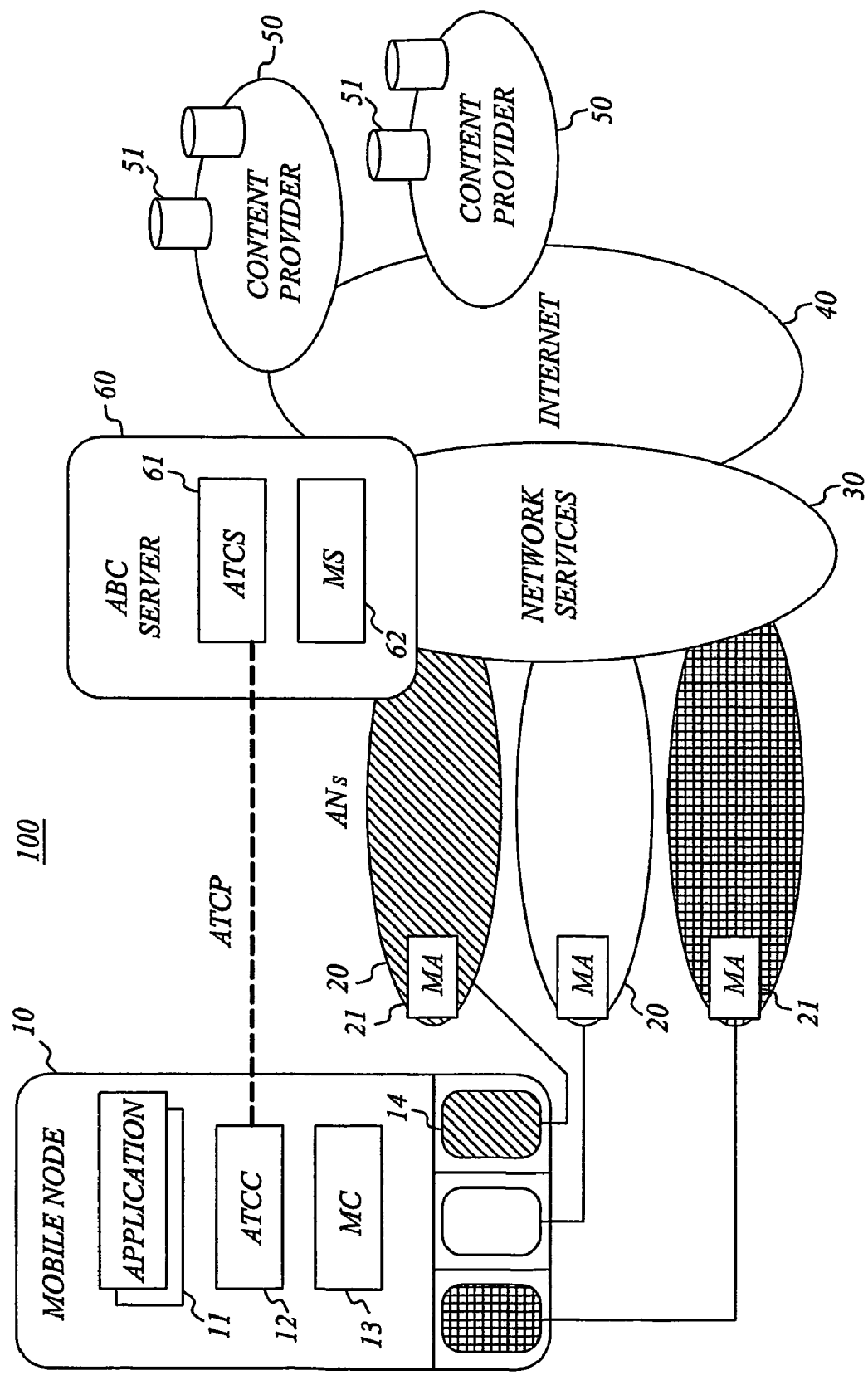
FIG. 2 is a schematic block diagram of a multi-access communication system with traffic control means according to an exemplary embodiment of the present invention.

FIG. 2 is a schematic block diagram of a multi-access communication system 100 with ATC means according to a preferred embodiment of the invention. A mobile node/terminal 10 hosting two applications 11 that each need external network access is shown. The multi-access terminal can for example be a laptop computer with more than one active application, e.g. comprising a webbrowser, a real player and/or a media player. The mobile terminal has three access network interfaces 14, each providing access to IP-based network services 30 over a respective access network 20. As in FIG. 1, content provider services 50 are offering the network services over the Internet 40.

The main ATC components in the multi-access communication system of FIG. 2 are an ATC client unit/function (ATCC) 12 provided in the mobile terminal 10 and an ATC server unit/function (ATCS) 61 arranged at network level (i.e. at the network side). In a preferred embodiment of the invention, the ATC server 61 maintains performance information (load level, blocking rates, access prices, etc.) from the access networks 20 and provides the ATC client 12 with continuous information on which access networks 20 to use and to what extent. The actual traffic splitting between the access networks is then performed by the ATC client based on the ATCS feedback information.

The ATC server function 61 can with advantage be incorporated in or associated with an overall access mechanism, e.g. providing means for access handling, mobility and security, such as an ABC server 60 of an ABC system as illustrated in FIG. 2. (For general information about the ABC concept, reference is made to [1].) The ATC server may for example use the ABC architecture of our U.S. Provisional Patent Application [4] for implementation purposes. Other embodiments may comprise ATC servers arranged elsewhere in the network, as stand-alone units or together with other services and the ATC server functionality can sometimes be distributed onto several ATCSs serving different subnetworks (e.g. local areas) in the network.

An ATC communication protocol (ATCP) is defined for the communication between ATC clients 12 and ATC servers 61. If the invention is used together with overall services (such as ABC), the ATC protocol can be included in the overall service framework, where clients and servers exchange general control information, such as user authentication information and user profiles. The ATC protocol defines the exchange of ATC related information, which may be broadcasted, multicasted, and/or unicasted from the ATCS to the ATCC and unicasted in the reverse direction. The feedback information from ATCS to ATCC can be periodically broadcasted/multicasted to a larger portion of the mobile terminals, although it does not necessarily apply to all terminals. A mobile terminal can also request feedback data from the ATCS by sending a solicitation message between periodic updates. Preferably, the ATC protocol is further designed to be able to use whichever of the accesses of a mobile terminal that are available and includes means for handling messages between ATCC and ATCS that arrive out of order. One example ATC protocol is based on the Hypertext Transfer Protocol (HTTP) and uses push and pull mechanisms for the control exchange, possibly Java-based to be platform independent.

Still referring to FIG. 2, the disclosed multi-access communication system 100 further comprises optional mobility support functionality by means of which users can move between access networks 20 as their devices 10 move in and out of coverage. More specifically, the mobility support is achieved through a mobility client unit/function (MC) 13 in the mobile terminal 10, a mobility server unit/function (MS) 62 in the network (e.g. at an ABC server 60), and mobility agents (MA) 21 distributed to respective access networks 20. These functions will be described in detail in the section "ATC with mobility support".

A key feature of the adaptive traffic control of the invention is closed loop control between the ATC client and the ATC server. This is evident from FIG. 3, which illustrates signal flows in an ATC control system according to an exemplary embodiment of the invention. The control system involves a number m of multi-access terminals 10 with ATC clients 12 and access network interfaces 14, multiple access networks 20 and a network-based ATC server 61.

The access networks 20 each provide the ATC server 61 with access-related information forming an output signal, such as a time dependent vector $y_i(t)$. The access-related information of the output signal comprises measured performance parameters or other access network describing parameters, including measures of system occupancy level, blocking rate, current traffic arrival rate, system delay, system throughput, current bandwidth cost etc. Since most applications expected to run on the multi-access terminal 10 are initiated from the terminal and not triggered from the network side, the access network selection needs to take the performance in both directions into account. Therefore, the ATC server 61 should preferably be provided with both uplink and downlink performance information from the access networks 20.

In addition to the access-related information from the access networks 20, the ATC server 61 may also receive terminal-specific access information $Y_{mn}$ from the ATC client 12 in the multi-access terminal/user device 10. $Y_{mn}$ can e.g. be a matrix containing information about available access networks, performance over the respective interfaces (delay, throughput, packet loss), battery level, session initiation intervals, session duration times etc.

The ATC server 61 aggregates the above information and generally processes the data in an appropriate manner depending on the situation. Through this coordinating of access information at the network side (by the ATCS), the invention offers a comprehensive approach towards the overall user traffic situation, facilitating inter-network traffic planning and by means of which the overall system performance can be improved.

The information from the access networks 20 (and mobile terminals) is used for adaptive traffic control calculations at the ATC server 61. Hereby, an adaptive traffic control algorithm is preferably invoked for reaching a predetermined control objective. The objective of the control typically relates to:
- achieving load balancing between different access networks and thereby increasing the overall system performance and robustness,
- maintaining prespecified ranges of performance parameters for the access networks, and/or
- optimizing the revenue of the overall system or parts of the system (access networks) depending on adopted traffic plans For the purpose of this document the term "adaptive" generally refers to a control algorithm that is continuously changing in response to changed conditions in the controlled system. By means of the adaptive functionality a predefined service level can be maintained during changing operational conditions, such as user mobility, radio channel quality, radio access network load and core access network load.

Figure 3:
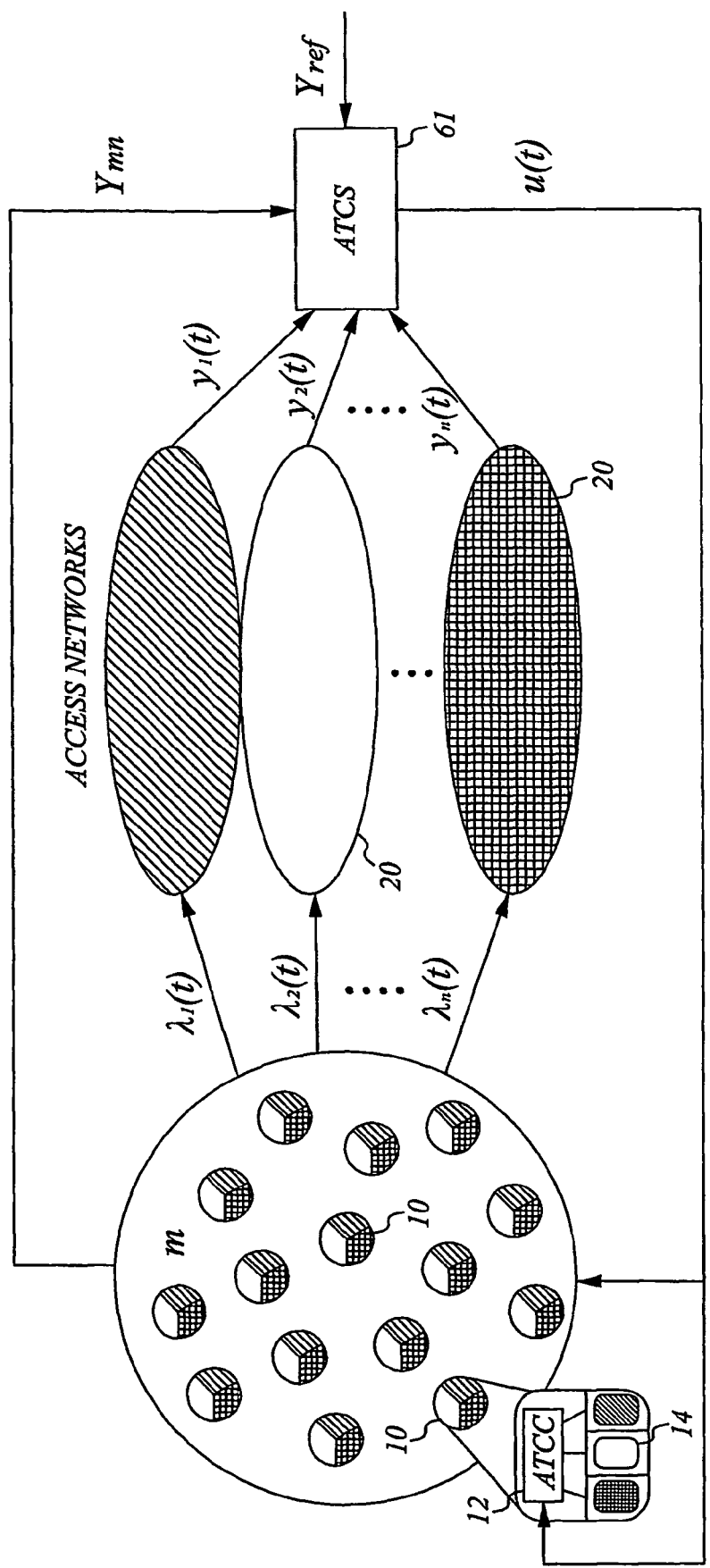
FIG. 3 illustrates traffic control for multi-access communication systems according to an exemplary embodiment of the present invention.

In the illustrated embodiment of FIG. 3 the control objective is expressed by the signal $Y_{ref}$ which is either determined at the access networks 20 and transferred to the ATC server 61 or determined by the ATC server itself. $Y_{ref}$ can be one-dimensional or multidimensional and normally includes load measures, number of customers and/or generic cost measures. The control algorithm tracks the reference values and outputs a feedback control signal u(t) that is sent back to the user devices 10.

The feedback control information u(t) may for instance include suggested session initiation (session arrivals) rates and recommendations on their distribution over the access networks 20. The control information u(t) can be specific for the respective user devices 10, specific for respective user device classes/groups or general control information broadcasted to all user devices. It can be sent upon initiative from the ATC server 61 (push) and/or when the mobile terminal 10 requests the information (pull). The push (broadcast) alternative implies less traffic overhead at high traffic loads since more terminal may receive the messages without having to request them. The pull (request) alternative, on the other hand, implies less traffic overhead at low loads since only the active terminals will request the information via pull. A third alternative is to combine push and pull by using timeout (T) triggered pushed broadcasts. As the load increases, T is then adaptively reduced to service more terminals with information and vice versa.

Based on the feedback control signal u(t), the multi-access terminals 10 spread their traffic, $\lambda_i(t)$, over at least a subset of the available access networks 20. The control information sent from the ATC server 61 to the ATC clients 12 will thus be used by the ATC clients to control/guide the fraction of traffic sent to each access network 20. Hereby, other factors than u(t) may also be considered in the final access selection decision performed by the ATC client 12. The traffic spreading can be achieved by means of a feedback vector with e.g. an explicit rate per access network or probabilities on how much to split the traffic over the available networks. It can be made on a per packet basis or on a per session basis. An advantageous embodiment of the invention with session-based traffic control will be described in detail in the section "Session-based ATC".

The adaptive traffic control procedure of the invention is generally repeated many times in an iterative or continuous process for reaching (or getting sufficiently close to) the control objectives. Output signals with access-related information are then continuously transmitted from the respective access networks to the ATC server for being input to the ATC algorithm, providing continuous feedback control information. In this way, the user traffic distribution over the access networks can be continuously adjusted for an optimal use of the current access network situation. This results in an enhancement of the overall performance in the multi-access system and constitutes a major advantage of the invention. Furthermore, the continuous iteration of the load control enables the system to adapt to changed network conditions in terms of number of users, offered traffic loads by the users, channel conditions of the users, etc.

It should be noted that access networks often deploy internal traffic management mechanisms to improve the traffic conditions at hand in response to available resources and incoming traffic. Such mechanisms may include balancing the number of mobile terminals between overlapping cells, hand-off of mobile terminals at cell boundaries, blocking/dropping of calls to sustain the overall performance etc. All these actions are performed internally within one access network. However, in cases when such intra AN traffic management cannot avoid overload there may still be overlapping resources belonging to another access network available. In such situations, the ATC solution offered by the invention, which via the ATCS provides an inter AN traffic management for mobile terminals capable of accessing multiple access networks, is very useful. The proposed adaptive traffic control mechanism considerably improves the overall performance (throughput, delay, overload robustness) in systems that cover several different types of access networks.

Although some existing traffic control schemes within the same technology in theory might be used also between operators of the same technology, the performance measurements necessary for such traffic control schemes are generally to revealing to be shared between the involved parties. Control at the network level in accordance with the present invention offers better ways of hiding the information and above all it can be kept generic for various access technologies. This independence of access technology is another advantageous feature of the present invention.

Figure 4:
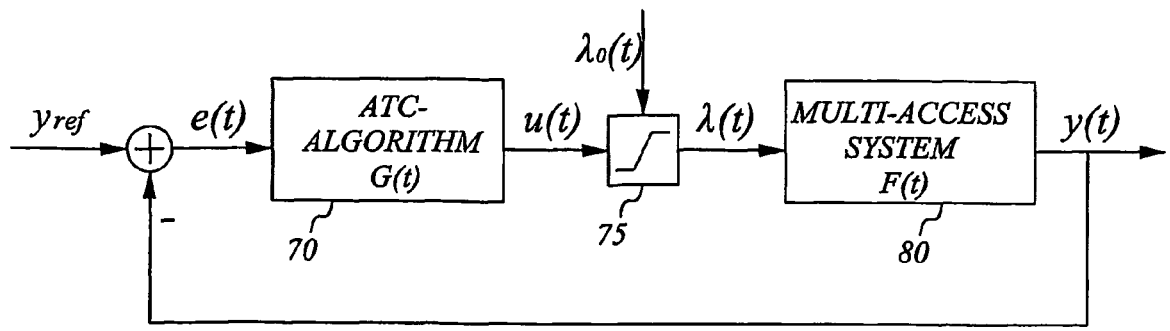
FIG. 4 is a system function block diagram of a traffic-controlled multi-access system according to an exemplary embodiment of the present invention.

The closed loop control system formed by the ATC system can be expressed in a system function block model that facilitates system analysis based on tools from automatic control theory. FIG. 4 contains such a block diagram of a traffic-controlled multi-access system in accordance with the invention. The signal notations correspond to those in FIG. 3.

The ATC controller 70, e.g. ATCS, generates the system control signal u(t) so as to minimize the error signal e(t), i.e. reach steady state. A preferred embodiment of the invention uses a conventional proportional and integral (PI) controller [5] for the control algorithm G(t). However, other controllers, including minimum-variance controllers and controllers with model-dependent polynomials like RST controllers as well as proportional, integral and derivative (PID) and pure proportional (P) controllers, can also be used for the ATC control algorithm of the invention. Depending on the control algorithm design, the ATC control objective can relate to other system parameters than the error signal e(t).

Due to physical limits basically all communication systems are to some degree non-linear. In the ATC case, the control signal u(t) is limited between the offered traffic $\lambda_o(t)$ and zero by means of a limiter 75, before being input to the multi-access system F(t) 80. Moreover, the access networks do not host more than a limited number of session, calls, packets etc., which may constrain the output signals. This creates non-linearity in the overall control loop that should be considered in the system design.

With an on/off-approach to access network selection and/or uncontrolled user behavior there is a risk of network oscillations. Through a properly designed ATC control mechanism in accordance with the present invention, such oscillatory behavior can be avoided. In the ATC design it is important to consider the complex stochastic behavior of the system and to weight factors like stability and response time against each other.

To further illustrate the system modeling, an example ATC system handling two access networks will be analyzed in the section "ATC system example".

The described examples have mainly focused on a solution where the ATC control algorithm is executed at the ATC server, which sends a control signal to the ATC client that in turn is responsible for the final access selection. This comprehensive network approach is associated with an excellent overall view of the traffic situation in the access networks and provides feedback information for efficient overall traffic control. Depending on factors like terminal capability, battery power situation, operator preferences etc it is however sometimes preferred to arrange the ATC functions differently. The placement of the functionality determining the traffic distribution over the access networks, i.e. the ATC algorithm and the traffic spread decision, is to a large extent optional and can be viewed as a flexible trade-off depending on the network situation.

In a totally network-centric embodiment, the determining of the traffic control signal, e.g. by means of the ATC algorithm, is performed at the ATC server, which also decides how the traffic spreading should be made. The ATC server forwards the traffic spread decision to the ATC client, which performs traffic distributing actions according to instructions from the ATC server. This solution normally requires that terminal-specific access information ($Y_{mn}$ in FIG. 3) is transmitted from the multi-access terminal to the ATC server for being used by the ATC server as basis for the traffic distribution.

In another embodiment of the invention, the ATC calculations are delegated to the ATC client in the multi-access terminal. The ATC server then forwards the aggregated and/or processed access-related information from the access networks to the ATC client, which executes the ATC algorithm and performs the traffic spread decision. Access-related information can be transmitted from the ATC server to the terminals through push and/or pull mechanisms. In this case, the terminal normally does not send terminal-specific access information to the ATC server and sometimes it may also be appropriate to fed some access-related information directly back to the terminals. Nevertheless, it should be understood that even if the ATC computations are performed at the ATC client, the ATC server may still be in control of the AN selection and traffic distribution procedure.

Various solutions in between these two embodiments are also possible, including a preferred embodiment where the ATC calculations are performed at the ATC server which sends a traffic distribution recommendation comprising the traffic control signal to the ATC client. Different embodiments of the present invention can thus comprise different degrees of control delegated to the multi-access terminal(s). Nevertheless, it should be emphasized that the invention in no sense is restricted to communication systems with the same control solution for all multi-access terminals. Adaptive traffic control systems comprising coexisting multi-access terminals associated with different degrees of client control/self control also lie within the scope of the invention. Systems where traffic controlling actions can be performed at different network positions for different multi-access terminals are in fact very advantageous, since they offer a flexible overall adaptive traffic control mechanism that is applicable on different types of mobile multi-access nodes.

Figure 5:
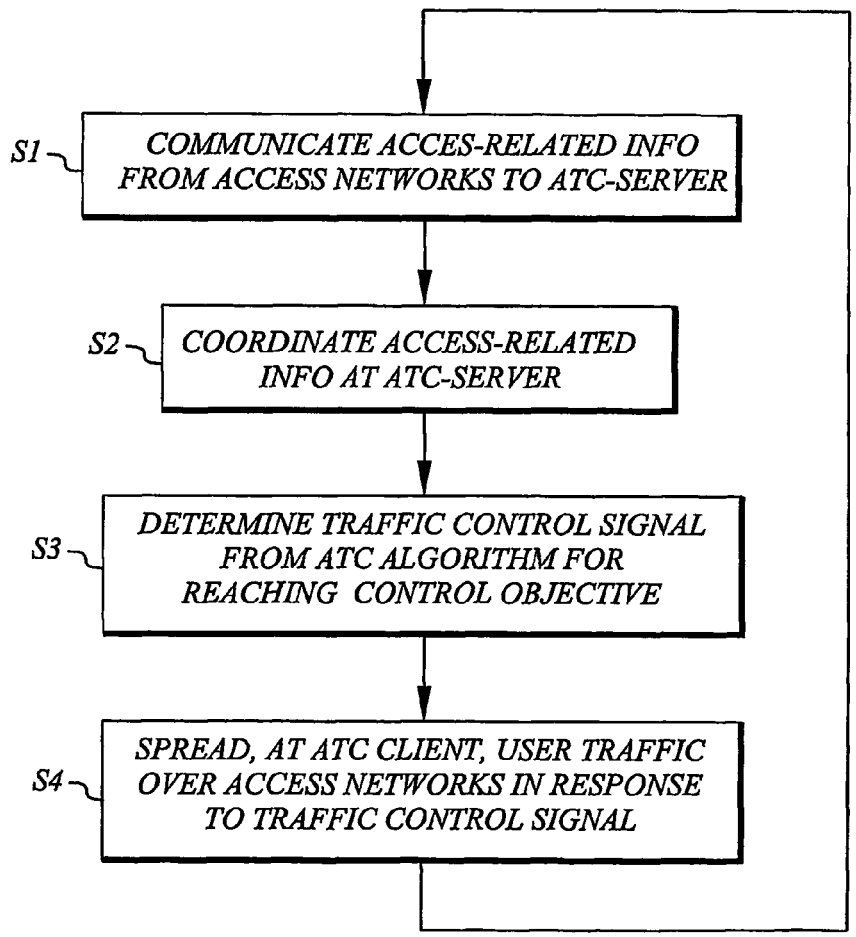
FIG. 5 is a flow chart of a traffic control method according to a preferred embodiment of the present invention.

FIG. 5 is a flow chart summarizing the main principles of a traffic control method according to a preferred embodiment of the invention. In a first step S1 access-related information is communicated from respective access networks to the traffic control server (ATC server). Preferably, the ATC server also receives information from the multi-access terminal(s). The ATC server, which is network-based, i.e. arranged on the network side/at network level, performs some coordinating actions upon the received information in a next step S2. This includes aggregating and typically also data processing of the information originating from different sources.

Thereafter, a traffic control signal is determined based on the coordinated information from the access networks (and multi-access terminal) in a step S3. This is achieved by adaptive traffic control calculations, preferably comprising iterative executions of an adaptive traffic control algorithm for the purpose of reaching a predetermined control objective, such as minimizing the difference between output signals from the controlled access system and predetermined reference measures/signals. In a preferred embodiment the adaptive traffic control algorithm is executed at the ATC server, but there may be embodiments where this is instead performed at a traffic control client (ATC client) associated with the multi-access terminal in a manner that may be at least partly client controlled or controlled by the ATC server.

In a final step S4, user traffic is spread or distributed over at least a subset of the access networks in response to the traffic control signal. User traffic is generally distributed over multiple access networks simultaneously but in some cases or for limited period of times it may be appropriate to let one access network have all traffic. (In this context, "simultaneously" distributed traffic implies that multiple access networks are used during a particular period of time, in the sense that there are traffic/packet flows to each of the access networks during that period.) The decision of how to spread the traffic over the different access networks is preferably performed by the ATC client based on traffic distribution information from the ATC server but can also be performed at the ATC server or ATC client, e.g. in connection with the adaptive traffic control calculations. Nevertheless, the actual traffic spreading is always performed at the multi-access terminal.

The traffic distribution information that is transferred from the ATC server to the ATC client in a preferred embodiment of the invention can e.g. involve a direct or indirect traffic spread recommendation comprising the control signal. Such a recommendation can be directly applicable for traffic distribution purposes or an indirect recommendation comprising more or less general information used by the ATC client to determine the traffic distribution.

Figure 6:
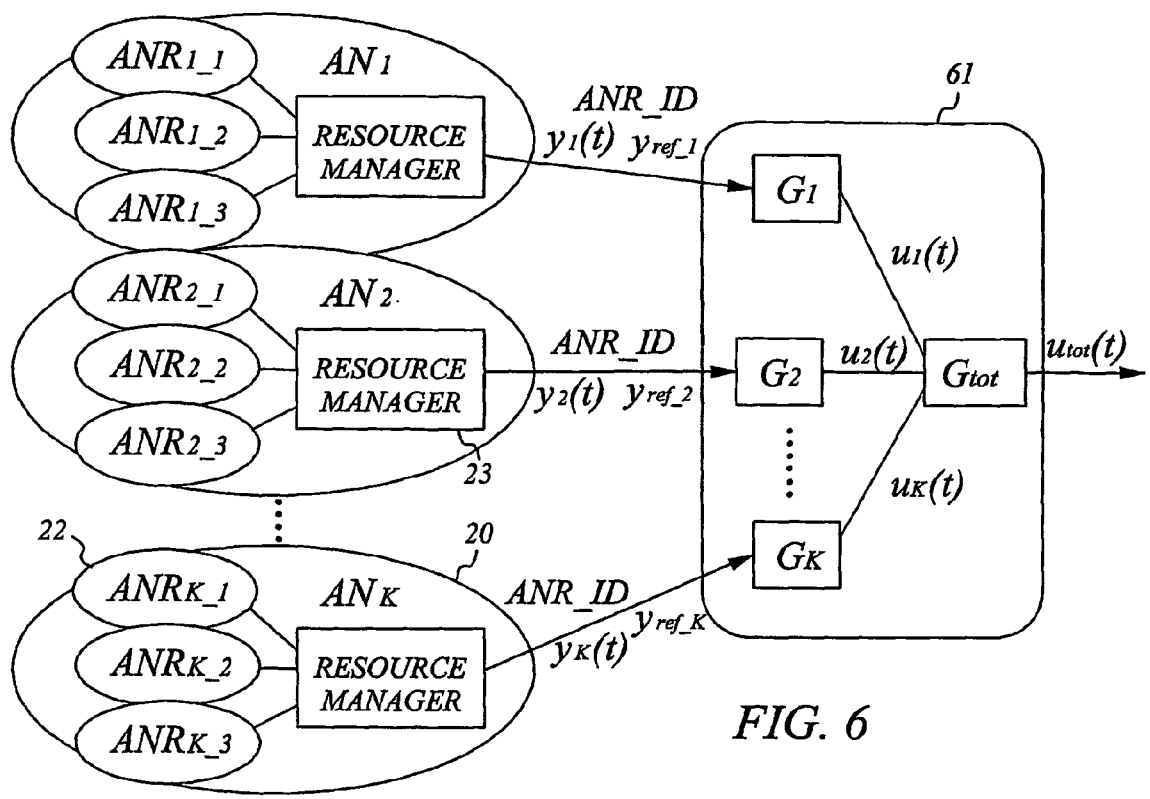
FIG. 6 illustrates information exchange between several access networks and a traffic control server according to an exemplary embodiment of the present invention.

The different access networks associated with an ATC server are continuously sending performance data to the ATC server. In case the access network is a comparatively large network, such as the entire network of a cellular, operator, it may be appropriate to associate different pieces of information with different subnetworks, also referred to as access network resources (ANRs). This is illustrated in FIG. 6, where a number (K) of access networks 20 are transmitting information to an ATC server unit 61 in accordance with an embodiment of the invention. In this example, each AN 20 comprises three ANRs 22 that are handled by a resource manager 23. The resource managers 23 serve as coordinators of the information that is to be transferred to the ATC server 61.

The access networks 20 are thus via the resource manager 23 continuously sending information comprising performance data to the ATC server 61. The information can for instance include a set, or a vector, of the measured output signal $y_i(t)$, desired reference values $y_{ref}$, and an identifier ANR_ID of the ANR to which the information applies. The output signal can e.g. comprise single, or combined, measures of blocking rates, packet/bit error rates, or load levels. Sending the ANR_ID together with information related to the ANR is especially advantageous when the access network comprises hundreds or thousands of ANR locations (an ANR could be a set of cell sites).

The ATC control algorithm is in a preferred embodiment executed at the ATC server 61 for each access network 20. Each control algorithm, $G_i$, then gives the required control signal $u_i(t)$ that satisfies the desired reference value $y_{ref\_i}$ for $AN_i$. The control signals $u_i(t)$ are aggregated into a composed control signal, $u_{tot}(t)$ (the output of the overall/total control algorithm $G_{tot}$), which is broadcasted to the ATC clients in the multi-access terminals. This control signal $u_{tot}(t)$ may be in the form of a vector or matrix with elements that address one or more control values for each ANR 22 of the respective access networks 20.

Furthermore, the mobile terminal may inform the ATC server of which ANR_IDs of the available access networks it can reach and utilize. By means of this selective feedback it is possible to only transmit control information related to the available ANR_IDs and the amount of control information received at each terminal can be reduced. However, from the ATC server point of view this means that the ATC server needs to unicast/multicast specific control messages to the terminals/terminal groups that can utilize the same set of ANRs in the access networks instead of sending the same information to all terminals.

Session-Based ATC

The multi-access terminals generally spread their traffic over the available access networks based on the feedback control signal u(t). As mentioned, the access selection can be session-based or packet-based. Session-based access selection implies that there can be a change in the used access network interface every time a new session is about to be initiated, such as during set-up of a new Transport Control Protocol (TCP) connection or User Datagram Protocol (UDP) session. The selected access network is normally maintained for the entire session (unless mobility support functions result in a change). Traffic spreading per session will now be described with reference to FIG. 7, which illustrates access network selection in accordance with a preferred embodiment of the invention.

Figure 7:
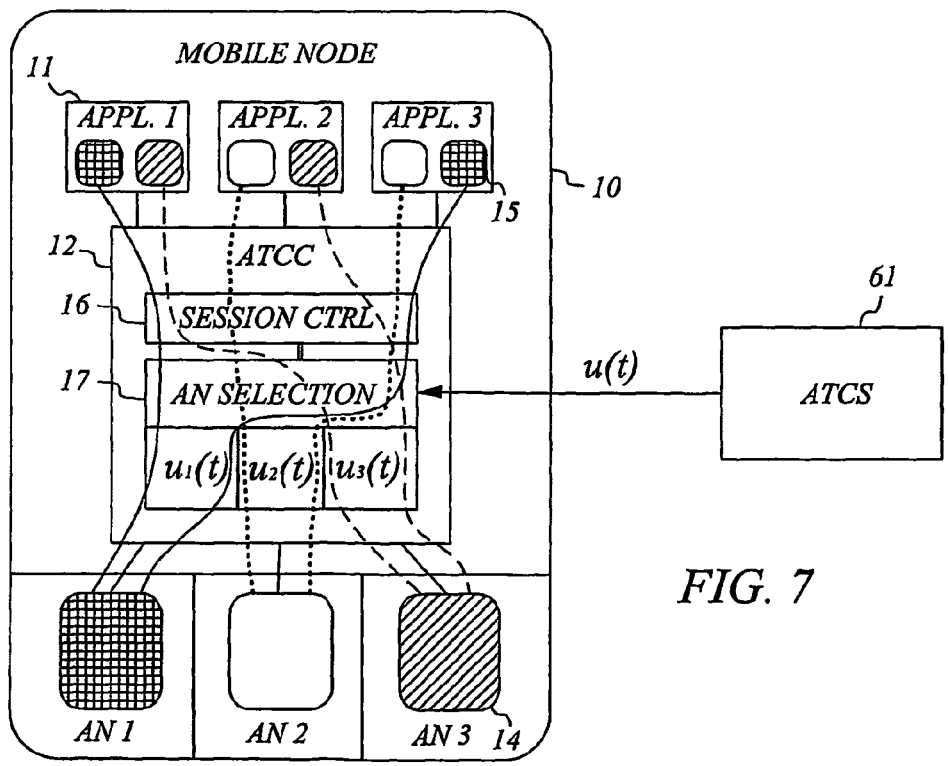
FIG. 7 illustrates session-based access network selection in accordance with an exemplary embodiment of the present invention.

FIG. 7 illustrates session initiation flows in a mobile node 10 that hosts several applications 11. The ATC client 12 acts as middleware between the applications 11 and the transport layer in the terminal 10. New session (connect) requests from applications 11 are by means of a session control subfunction 16 in the mobile terminal 10 directed to an access network interface 14 based on the feedback information u(t) from the ATC server 61.

Accordingly, each newly initiated session 15, e.g. a TCP or UDP session, triggers an access selection in the session control subfunction 16. The session is assigned a unique session handle with local significance. Upon receiving a session request from an application 11, the session control subfunction 16 sends a selection inquiry to an AN selection subfunction 17 in the ATC client 12. The inquiry may contain application type, QoS requirement and the assigned session handle. Based on this information as well as on the ATC server feedback value u(t) the AN selection subfunction 17 preferably decides which access network to use for the session 15 by means of a traffic spread algorithm. Additional requirements affecting the decision may come from the applications 11 and the terminal power management. Based on these application requirements, terminal preferences and ATC feedback control signals, the AN selection subfunction 17 sends a response to the session control subfunction 16 with the access network to use for the session 15 in question. The access network is for instance identified through the IP address of the outgoing interface 14.

After receiving the access selection response, the session control subfunction 16 performs a unique session identification based on the source IP address, source port number, destination IP address, and destination port number. This association of a session 15 to an access network is referred to as session binding. Once the session is established through the session binding actions, its associated packets are all sent over the selected access network interface 14 throughout the remainder of the session.

The actual data packet flow typically does not pass through the ATC client 12 once the access network selection is completed. The session binding is used to direct the IP packets of each session flow to its associated outgoing access network interface 14. This may be accomplished by policy routing in the mobile terminal 10, with a routing decision based on the session binding. The session binding is bidirectional in the sense that an established session 15 tied to a particular outgoing access network 14, expects to also receive packets over the same interface.

An advantage associated with session based traffic spreading is that it involves less processing than a corresponding packet-based spreading. In the latter case, a decision of interface selection has to be made for every packet sent from the terminal to the network and vice versa. Another advantage of session-based access selection is that re-sequencing of for instance TCP packets belonging to the same session can be avoided. Packets within a session (e.g. TCP or UDP) stand the risk of arriving out of sequence, which may trigger redundant retransmissions. If the interface selection is made per session, the occurrence of this event is expected to be less frequent and the packet sequence would not be affected.

Accordingly, ATC preferably operates on timescales of integral sessions and/or calls in order to keep down processing in the network and user device. However, if deemed appropriate the ATC may also make decisions with smaller time granularity, e.g. per packet.

ATC with Mobility Support

For many applications, it is desirable to maintain a session even when the initial interface has become unavailable due to e.g. lack of coverage. Since the session identity generally is tied to the IP address (session binding) of the used access network interface, a simple switch to another access network with another IP address would break the session binding and the session would be lost.

One way of dealing with this problem is to maintain the same IP address for the application, while changing the physical interface to which this IP address is associated, as in Mobile IP (MIP) solutions [6]. In MIP, the mobile terminal is assigned one home IP address to be used by its applications irrespective of where the terminal is located. If the mobile terminal is in a foreign network, the traffic to and from the home network is relayed, via a foreign agent or directly to the terminal, by means of IP tunneling. In this way, the IP traffic flows to/from applications in the terminal are maintained by the MIP functions as if the terminals are always located in the home network.

A preferred mobility mechanism of the ATC scheme according to the present invention is based on the MIP architecture. However, mobile terminals used in accordance with the invention may have simultaneous IP flows over more than one access network interface due to the spreading of sessions over the active interfaces. MIP is hereby insufficient since it only operates with one active interface per mobile node at a time, while the mobility function of the ATC system must be able to operate on a set of simultaneously active access interfaces each connected to a respective access network. The present invention therefore achieves mobility by means of IP tunneling, but proposes additional features, such as mobility IP addresses and virtual access network interfaces to be able to handle mobility between multiple active interfaces. An embodiment of ATC with mobility support will now be described in detail with reference to FIG. 8.

Figure 8:
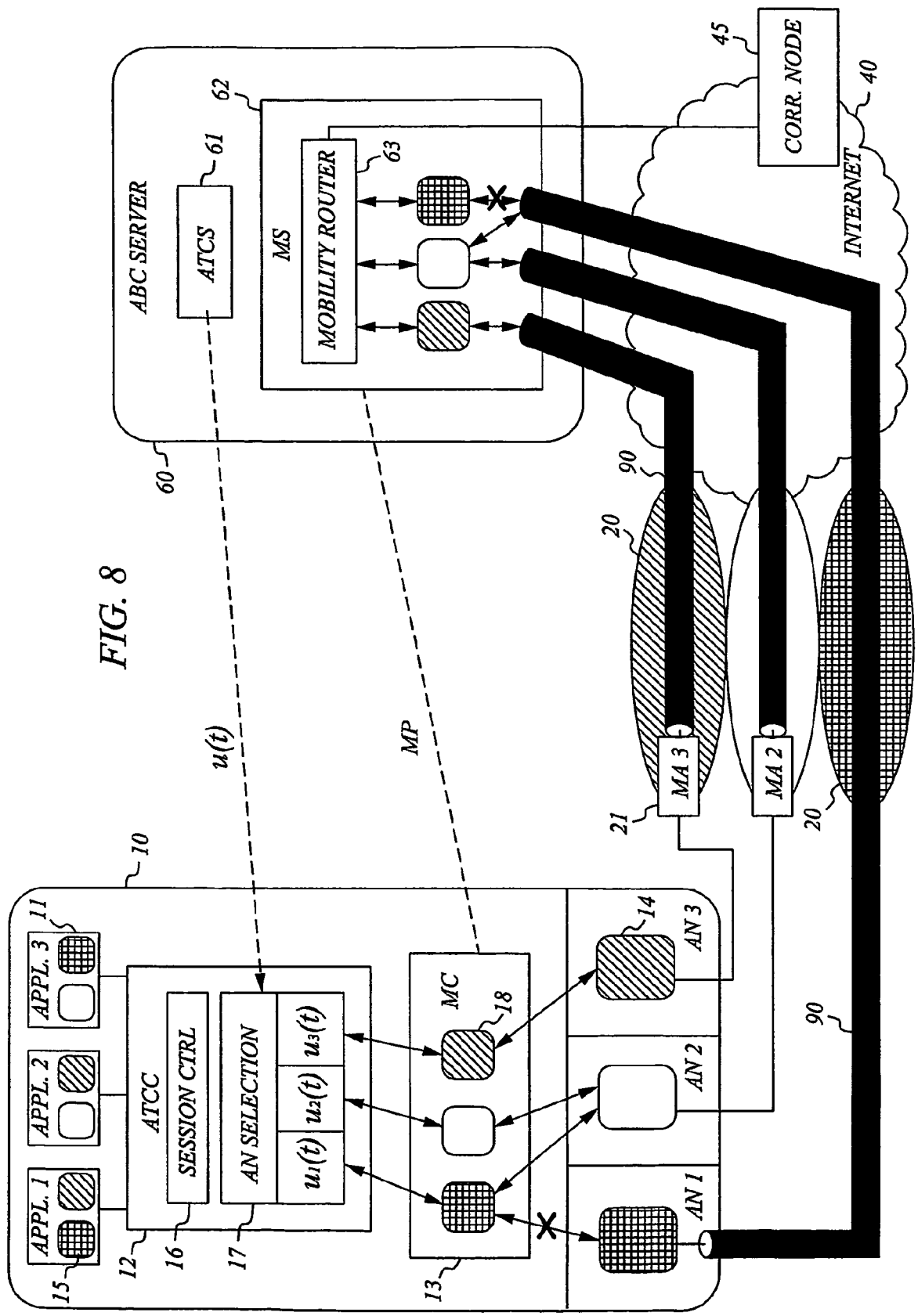
FIG. 8 is a schematic block diagram of a multi-access communication system with mobility support according to an exemplary embodiment of the present invention.

The proposed mobility service consists of three main functional blocks: the mobility client (MC) 13, the mobility server (MS) 62, and the mobility agent (MA) 21. The implementations of the MC, MS and MA, respectively, can with advantage be based on the MIP client, the MIP home agent and the MIP foreign agent, respectively. The MC 13 handles access network detection and session continuity for the multi-access terminal 10. The MC 13 of FIG. 8 is arranged in a mobile multi-access terminal 10 with functional elements corresponding to those in FIG. 7. The MS 62 handles session continuity functionality in the network, e.g. handover and/or multi-flow multiplexing/demultiplexing. In the illustrated example the MS 62 is arranged in an overall/multi-function server 60 together with the ATC server 61. The MS 62 preferably comprises a mobility routing unit/function 63 that is able to communicate with a correspondent node 45 over an IP transit network, such as the Internet 40. The MA 21 provides mobility support distributed to the different access networks 20, such as detection of mobility function services and mobility redirection functions.

A main feature of the mobility mechanism according to the invention is that the multi-access mobile terminal 10 uses one "home" IP address, referred to as mobility IP address, per access network 20. The mobility IP addresses are issued by the MS 62 to be used for applications 11 that require session continuity in multi-access networks. The association of respective mobility IP addresses to respective access networks 20 changes dynamically as the terminal 10 moves in and out of the coverage of different access networks 20.

The MC 13 registers the terminal 10 to the MS 62 over each active access network, either directly or via a MA 21 located in the access network 20. For each access network the terminal hereby provides the MS with an IP address of the MA 21 in the access network 20 (a care-of IP address) or an IP address of its own access network interface 14 (a co-located care-of IP address). The latter case is typically used if no MA is present in the access network. The MS 62 uses these addresses to set up IP tunnels 90. The respective IP tunnels 90 are arranged either between the MS 62 and the MA 21, or all the way from the MS 62 to the MC 13. In the example of FIG. 8, the terminal is using a combination of one co-located care-of IP address (AN 1) and two MA based care-of IP addresses (AN 2 and AN 3).

In the registration process, the MS 62 also provides the terminal 10 with one mobility IP address per access network 20, i.e. one per mobility tunnel 90. At the MC 13 the respective mobility IP addresses are associated with respective virtual interfaces 18, each being loosely associated with a particular access network interface 14, e.g. to the access network 20 that the address was retrieved over. As a communication session 15 (e.g. a TCP or UDP session) is set up the application 11 in the terminal then uses one of the virtual interfaces 18 and thus one of the mobility IP addresses. The virtual interface allocation for the sessions 15 can be performed as described above with reference to FIG. 7, but operating on virtual interfaces 18 rather than the real access network interfaces 14.

When an access network 20 becomes unavailable, the associated virtual interface 18 (and mobility IP address) needs to be associated with another available access network. The MC 13 invokes a hand-over mechanism to move the sessions associated with a mobility IP address. For this, a new mobility tunnel from the MS to the MC/MA but over another access network can be set up. If there already exists a tunnel 90 for traffic from the MS 62 to the MC 13/MA 21 using another virtual interface/mobility IP address, an alternative is to let the moved traffic flows use this tunnel instead, as illustrated in FIG. 8 where AN 2 is replacing the unavailable AN 1. This only requires updates of the IP address bindings in the MS 62, MA 21 (if used) and terminal 10. However, in some cases such an update can be difficult because of security concerns and new IP-tunnels are then provided.

New sessions should preferably not be directed to a virtual interface 18 associated with an unavailable access network 20, but instead assigned an active virtual interface by the ATC client 12. This makes the situation with multiple mobility IP addresses associated with the same access network temporary. As ongoing sessions using the "moved" virtual interface end, this virtual interface eventually becomes unused and can be terminated. Alternatively, if the access network becomes active again, the virtual interface could be "moved" back to the original access network through the described hand-over mechanisms.

The mobility functions of the ATC system result in an additional degree of dynamics since traffic flows can move between access networks within the session duration. Therefore, the control algorithm is preferably designed to compensate for additional "noise" in the control loop (unless the handover sessions are dominating the aggregated flow of traffic).

ATC System Example

Figure 9:
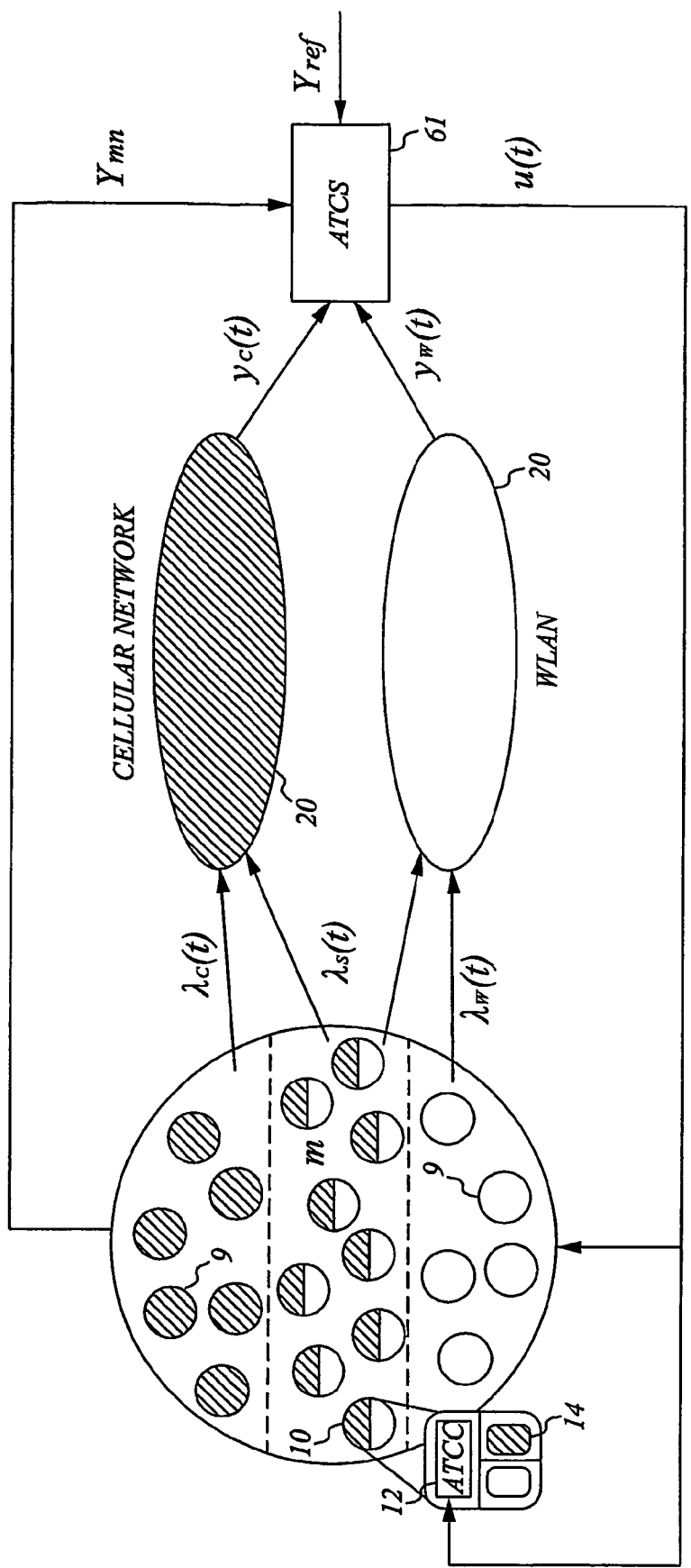
FIG. 9 illustrates traffic control for an exemplary communication system comprising two access networks in accordance with an embodiment of the present invention.

FIG. 9 illustrates an example case where adaptive traffic control according to an embodiment of the invention is applied onto a comparatively simple communication system comprising one cellular access network and one WLAN access network that are sharing datacom traffic. The access networks 20 have two types of mobile terminals: terminals 10 that can use/reach either the WLAN or the cellular access and terminals 9 that can only use one of the networks due to e.g. device constraints or coverage limitations. From a control point of view, the ATCS 61 has only the dual-access terminals 10 to work with in order to achieve the control objective ($Y_{ref}$). The traffic sent into the system is in the form of session arrivals, such as TCP or UDP session initiations. A session arrival implies that a flow of IP packets will follow for a limited period of time. This resembles an arrival and duration of a call in a traditional telephony system. The rates of the session arrivals are denoted $\lambda_c(t)$, $\lambda_w(t)$, and $\lambda_s(t)$ for the cellular, WLAN, and shared traffic, respectively.

In order to design a control algorithm for the system, a dynamic model of the controlled system is introduced. In this case, the cellular network is approximated with a fluid flow model of a multiserver loss system and the WLAN network is approximated with a fluid flow Processor Sharing (PS) model. In the cellular model, arriving sessions are assumed to occupy one server each for the duration of the session, which is serviced at rate of $\mu_c(t)$. In the WLAN model arriving sessions are instead assumed to share the server capacity fairly at a total rate of $\mu_w(t)$. The main difference compared to the multi-server model is that a single session will be serviced with the full capacity.

In this example system, the ATC objective is to maintain the system occupancy (number of serviced sessions) in both access networks below a certain level. The differential equation for the (fluid flow) occupancy level, $y_c(t)$, of the cellular system is $$\frac{d}{dt}y_c(t) = -y_c(t) \cdot \mu_c(t) + \lambda_c(t) + u_c(t) \cdot \lambda_s(t) \quad (1)$$

and for the WLAN system the differential equation for the occupancy, $y_w(t)$, is $$\frac{d}{dt}y_w(t) = -\mu_w(t) + \lambda_w(t) + u_w(t) \cdot \lambda_s(t), \quad (2)$$

where $u_c(t)$ and $u_w(t)$ are control signals used to control the system. For the control signals the following holds:

$$\begin{cases} u_c(t) + u_w(t) \leq 1 \\ 0 \leq u_c(t) \leq 1 \\ 0 \leq u_w(t) \leq 1 \end{cases} \quad (3)$$

The constraints in (3) enables a probabilistic traffic split of the incoming traffic with the probabilities $u_c(t)$ and $u_w(t)$, which simplifies implementation of the control functions as well as queuing analysis of the system.

Both $y_c(t)$ and $y_w(t)$ are positive values, i.e. the occupancy cannot be negative. Moreover, since a fluid flow approximation is assumed, the occupancy level could be any real value and not only integers.

The control algorithm deployed for this system is using a proportional and integrating (PI) control law for the system occupancy in each sub-system (cellular and WLAN) according the following design:

$$\begin{cases} u_c(t) = K_c\left(e_c(t) + \dfrac{1}{T_{ic}} \int_{t_0}^{t} e_c(\tau)\,d\tau\right) \\ u_w(t) = K_w\left(e_w(t) + \dfrac{1}{T_{iw}} \int_{t_0}^{t} e_w(\tau)\,d\tau\right) \end{cases} \quad (4)$$

where the error signals for the occupancy values relative the desired reference values are defined as:

$$\begin{cases} e_c(t) = y_{ref}^c - y_c(t) \\ e_w(t) = y_{ref}^w - y_w(t) \end{cases} \quad (5)$$

Note that (4) must still observe the constraints in (3). The parameters K and $T_i$ control the dynamics of the control loop in terms of how fast the system will track the reference values. The wrong selection of values for K and $T_i$ may cause the system to oscillate and such an oscillation may be exacerbated by the non-linear system behavior created by the constraints in occupancy levels (nonzero and maximum occupancy) and the control signal (between 0 and 1). The parameters K and $T_i$ should be determined such that the solution for the system transfer function is stable, i.e. the poles of the characteristic polynomial for the transfer function is located in the negative imaginary plane. In this example, K and $T_i$ are determined through simulations of the dynamic model of the controlled system.

Figure 10:
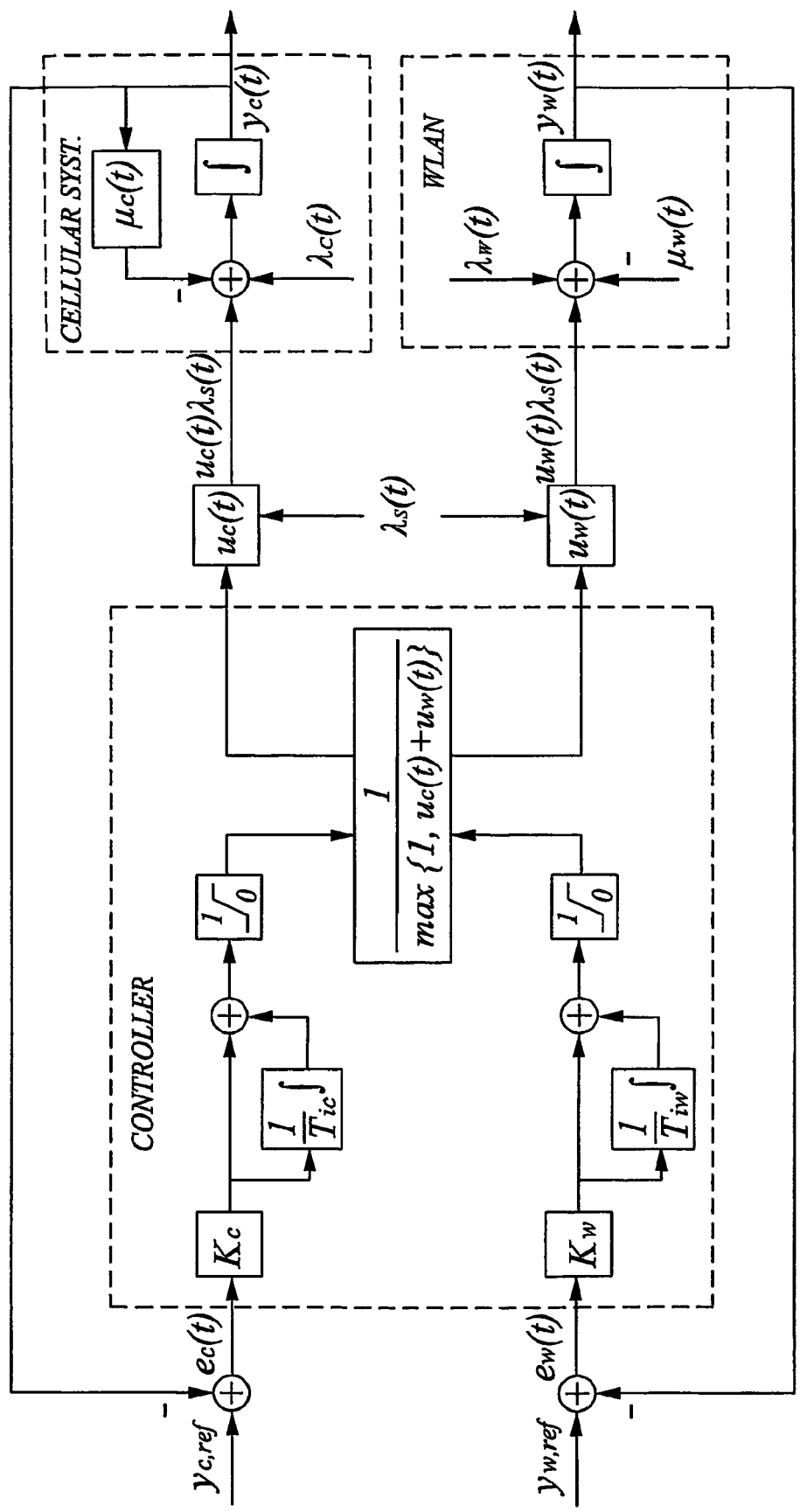
FIG. 10 is a block diagram illustrating traffic control of a modeled dual-access system (corresponding to FIG. 9) according to an exemplary embodiment of the present invention.

FIG. 10 is a block diagram illustrating traffic control of the dynamic model of the system in FIG. 9 according to an exemplary embodiment of the invention. The system is based on the above models of the respective access networks and the control algorithm uses a PI controller. Computer simulations of this example system indicate that excellent traffic sharing among different access networks can be achieved with the ATC method of the present invention.

Although the invention has been described with reference to specific illustrated embodiments, it should be emphasized that it also covers equivalents to the disclosed features, as well as modifications and variants obvious to a man skilled in the art. Thus, the scope of the invention is only limited by the enclosed claims.

REFERENCES

[1] E. Gustafsson, A. Jonsson, "Always Best Connected", IEEE Wireless Communications, February 2003, vol. 10, no. 1.
[2] International Patent Application WO 01/35585 A1, Telefonaktiebolaget LM Ericsson, publication date May 17, 2001.
[3] US Patent Application 2001/0141393 A1, G. Eriksson et. al., publication date Oct. 3, 2002.
[4] U.S. Provisional Patent Application 60/466,422, E. Gustafsson et. al., filing date Apr. 30, 2003.
[5] K. Åström, B. Wittenmark, "Computer-Controlled Systems", $3^{rd}$ ed., pp. 306-320, Prentice Hall Inc., 1997.
[6] C. Perkins, "IP Mobility Support for IPv4", IETF RFC 3344, August 2002.

The invention claimed is:

1. A method for traffic control in a communication system comprising a plurality of access networks and at least one mobile multi-access terminal, said method comprising the steps of:
  receiving, at a network-based traffic control server of the communication system, access-related information from at least a subset of the access networks;
  coordinating the access-related information at the traffic control server;
  determining a traffic control signal through adaptive traffic control calculations based on the coordinated access-related information, wherein said determining step is performed at the traffic control server and involves a traffic-spread decision by the traffic control server, said method further comprising the step of forwarding the traffic spread decision to a traffic control client of a multi-access terminal; and,
  spreading, at said traffic control client of the multi-access terminal, traffic over the access networks in response to the traffic control signal.

2. The method of claim 1, wherein the adaptive traffic control calculations involves iteratively executing an adaptive traffic control algorithm for reaching a predetermined control objective.

3. The method of claim 2, wherein the adaptive traffic control algorithm is selected from the group consisting of a proportional and integral (PI) control algorithm, a proportional, integral and derivative (PID) control algorithm, a proportional (P) control algorithm, a minimum-variance control algorithm and an RST control algorithm.

4. The method of claim 1, wherein the spreading step involves distributing traffic over at least two access networks substantially simultaneously.

5. The method of claim 1, wherein the determining step is performed at the traffic control server, said method further comprising the steps of:
  transmitting a traffic distribution recommendation comprising the traffic control signal from the traffic control server to the traffic control client; and,
  deciding, at the traffic control client, how to spread traffic over the access networks based on the traffic distribution recommendation.

6. The method of claim 1, further comprising the step of receiving, at the traffic control server, terminal-specific access information from the multi-access terminal, the terminal-specific access information being used in the determining and/or deciding step at the traffic control server.

7. The method of claim 1, further comprising the step of forwarding the coordinated access-related information from the traffic control server to the traffic control client, and wherein the determining step is performed at the traffic control client.

8. The method of claim 1, wherein the traffic spreading step is further based on terminal requirements and/or access network requirements.

9. The method of claim 1, wherein, for a communication system with a plurality of multi-access terminals, for at least a subset of the multi-access terminals, traffic controlling actions are performed at different network positions for different multi-access terminals.

10. The method of claim 1, wherein the adaptive traffic control calculations involve minimizing the difference between a desired value and a current value of an access-related parameter.

11. The method of claim 10, wherein the desired value of the access-related parameter is determined at the respective access network and included in the access-related information transmitted to the traffic control server from the respective access network.

12. The method of claim 10, comprising the step of determining the desired value of the access-related parameter at the network-based traffic control server.

13. The method of claim 1, wherein the traffic spreading step at the traffic control client is session-based.

14. The method of claim 13, wherein said traffic spreading step comprises the steps of:
receiving a session request at the multi-access terminal;
selecting an access network for the session of the session request at the traffic control client in the multi-access terminal; and,
associating the session with the selected access network at the traffic control client, whereby packets of the session are directed to the selected access network.

15. The method of claim 1, further comprising the steps of:
assigning a respective mobility IP address for each access network of the multi-access terminal; and,
associating, at the multi-access terminal, the respective mobility IP addresses with respective virtual access network interfaces.

16. The method of claim 1, wherein the traffic control server is associated with an overall access server with means for access handling, mobility and security.

17. A communication system including a plurality of access networks, at least one mobile multi-access terminal and means for traffic control, comprising:
means for receiving, at a network-based traffic control server of the communication system, access-related information from at least a subset of the access networks;
means for coordinating the access-related information at the traffic control server;
means for determining a traffic control signal through adaptive traffic control calculations based on the coordinated access-related information; and,
means for spreading, at a traffic control client associated with the multi-access terminal, traffic over the access networks in response to the traffic control signal;
wherein the means for determining is arranged at the traffic control server, said system further comprising:
means for transmitting a traffic distribution recommendation comprising the traffic control signal from the traffic control server to the traffic control client; and,
means for deciding, at the traffic control client, how to spread traffic over the access networks based on the traffic distribution recommendation.

18. The system of claim 17, wherein the means for determining comprises means for iteratively executing an adaptive traffic control algorithm for predetermined control purposes.

19. The system of claim 17 having a plurality of multi-access terminals, wherein, for at least a subset of the multi-access terminals, different multi-access terminals comprise traffic control means associated with different degrees of self-control.

20. The system of claim 17, wherein the traffic control server is associated with an overall access server with means for access handling, mobility and security.

21. The system of claim 17, wherein the access networks of the communication system include at least one access network using a technology selected from the group consisting of GPRS, WLAN, Ethernet, Bluetooth, WiFi, xDSL, CDMA, WCDMA and cable modem.

22. A network-based traffic control server device in a communication system including a plurality of access networks, at least one mobile multi-access terminal and means for traffic control, said server device comprising:
means for receiving access-related information from at least a subset of the access networks;
means for coordinating the access-related information;
means for determining a traffic control signal through adaptive traffic control calculations based on the coordinated access-related information; and, means for transmitting traffic distribution information comprising the traffic control signal to a traffic control client of the multi-access terminal, whereby said traffic control client can spread traffic over the access networks in response to the traffic control signal.

23. The server device of claim 22, wherein the means for determining in turn comprises means for iteratively executing an adaptive traffic control algorithm for predetermined control purposes.

24. The server device of claim 23, wherein the adaptive traffic control algorithm is selected from the group of a proportional and integral (PI) control algorithm, a proportional, integral and derivative (PID) control algorithm, a proportional (P) control algorithm, a minimum-variance control algorithm and an RST control algorithm.

25. The server device of claim 22, wherein the means for determining comprises traffic-spread deciding means, and the server device further comprises means for forwarding the traffic spread decision to the traffic control client.

26. The server device of claim 22, wherein the traffic distribution information comprises a traffic distribution recommendation based on which traffic can be spread over the access networks.

27. The server device of claim 22, further comprising means for receiving terminal-specific access information from the multi-access terminal.

28. The server device of claim 22, wherein the coordinating step involves aggregating or processing the access-related information.

29. The server device of claim 22, wherein the adaptive traffic control calculations involve minimizing the difference between a desired value and a current value of an access-related parameter.

30. The server device of claim 22, being associated with an overall access server with means for access handling, mobility and security.

31. A mobile multi-access terminal for use in a communication system having a plurality of access networks and a network-based traffic control server, said terminal comprising:
means for receiving, at a traffic control client of said terminal, traffic distribution information comprising a traffic control signal determined through adaptive traffic control calculations from the traffic control server, said traffic control server having determined said traffic control signal as a function of access-related information received from at least a subset of said access networks; and,
means for spreading, at the traffic control client of said terminal, traffic over the access networks in response to the traffic control signal.

32. The multi-access terminal of claim 31, wherein the means for spreading involves means for distributing traffic over at least two access networks substantially simultaneously.

33. The multi-access terminal of claim 31, wherein the means for spreading in turn comprises:
means for receiving a session request;
means for selecting an access network for the session of the session request at the traffic control client; and,
means for associating the session with the selected access network at the traffic control client, whereby packets of the session are directed to the selected access network.

* * * * *

UNITED STATES PATENT AND TRADEMARK OFFICE
CERTIFICATE OF CORRECTION

PATENT NO. : 7,904,090 B2  
APPLICATION NO. : 10/595973  
DATED : March 8, 2011  
INVENTOR(S) : Johansson et al.

Page 1 of 1

It is certified that error appears in the above-identified patent and that said Letters Patent is hereby corrected as shown below:

In Column 2, Line 55, delete "iterative/continues" and insert -- iterative/continuous --, therefor.

In Column 4, Line 19, delete "XDSL" and insert -- xDSL --, therefor.

In Column 6, Line 49, delete "multidimensional" and insert -- multi-dimensional --, therefor.

Signed and Sealed this  
First Day of November, 2011

David J. Kappos  
*Director of the United States Patent and Trademark Office*